United States Patent [19]

Krause

[11] 3,827,522

[45] Aug. 6, 1974

[54] FLUID PRESSURE ACTUATED BRAKE LIGHT SWITCH

[75] Inventor: Kenneth M. Krause, Saukville, Wis.

[73] Assignee: Koehring Company, Milwaukee, Wis.

[22] Filed: Aug. 10, 1973

[21] Appl. No.: 387,344

[52] U.S. Cl................ 180/66 R, 200/82 D, 340/70
[51] Int. Cl............................................. B60t 17/00
[58] Field of Search .... 200/82 R, 82 B, 82 C, 82 D, 200/153 LA; 340/52 R, 52 B, 52 C, 66, 69, 70, 71, 91, 94, 67, 136; 180/66 R, 66 A

[56] References Cited
UNITED STATES PATENTS

| | | | |
|---|---|---|---|
| 2,829,213 | 4/1958 | Brett | 340/70 X |
| 2,887,960 | 5/1959 | Tobias | 180/66 R |
| 3,194,608 | 7/1965 | Rich | 200/82 D X |
| 3,275,769 | 9/1966 | Weaver | 200/82 R |
| 3,614,273 | 10/1971 | Wallace | 214/778 |

Primary Examiner—David Schonberg
Assistant Examiner—David M. Mitchell
Attorney, Agent, or Firm—Andrew J. Beck

[57] ABSTRACT

A hydraulically propelled material handling vehicle, such as an end loader or lift truck, operable off-road and over-the-road, requires rear-mounted brake lights for over-the-road operation which illuminate to warn whenever the vehicle is braked (decelerated) while traveling in the forward direction or whenever the vehicle is traveling at any speed in the reverse direction. The vehicle wheels are driven by hydraulic motors supplied with fluid through a hydraulic circuit from engine-driven pumps and the vehicle's direction of movement and rate of speed are determined by a single pedal control in the operator's cab. The hydraulic circuit comprises a relief valve manifold having a passage wherein fluid pressure exceeds a predetermined level when the vehicle is braked (decelerated) while moving in the forward direction or whenever the vehicle moves at any speed in the reverse direction. A pressure responsive switch actuator connected to the aforesaid passage operates an electric switch to turn on the brake light whenever pressure in the passage exceeds the predetermined level.

8 Claims, 15 Drawing Figures

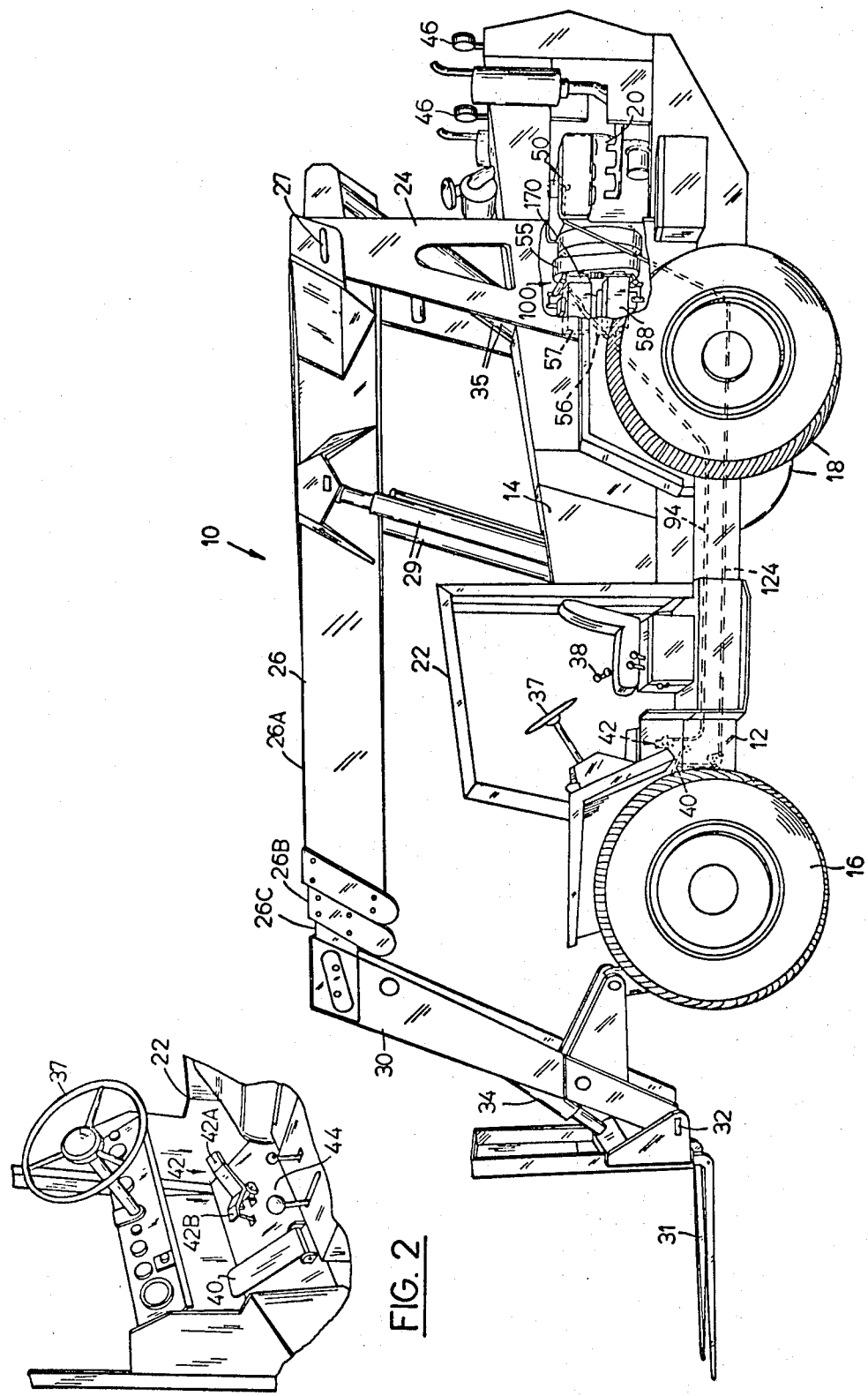

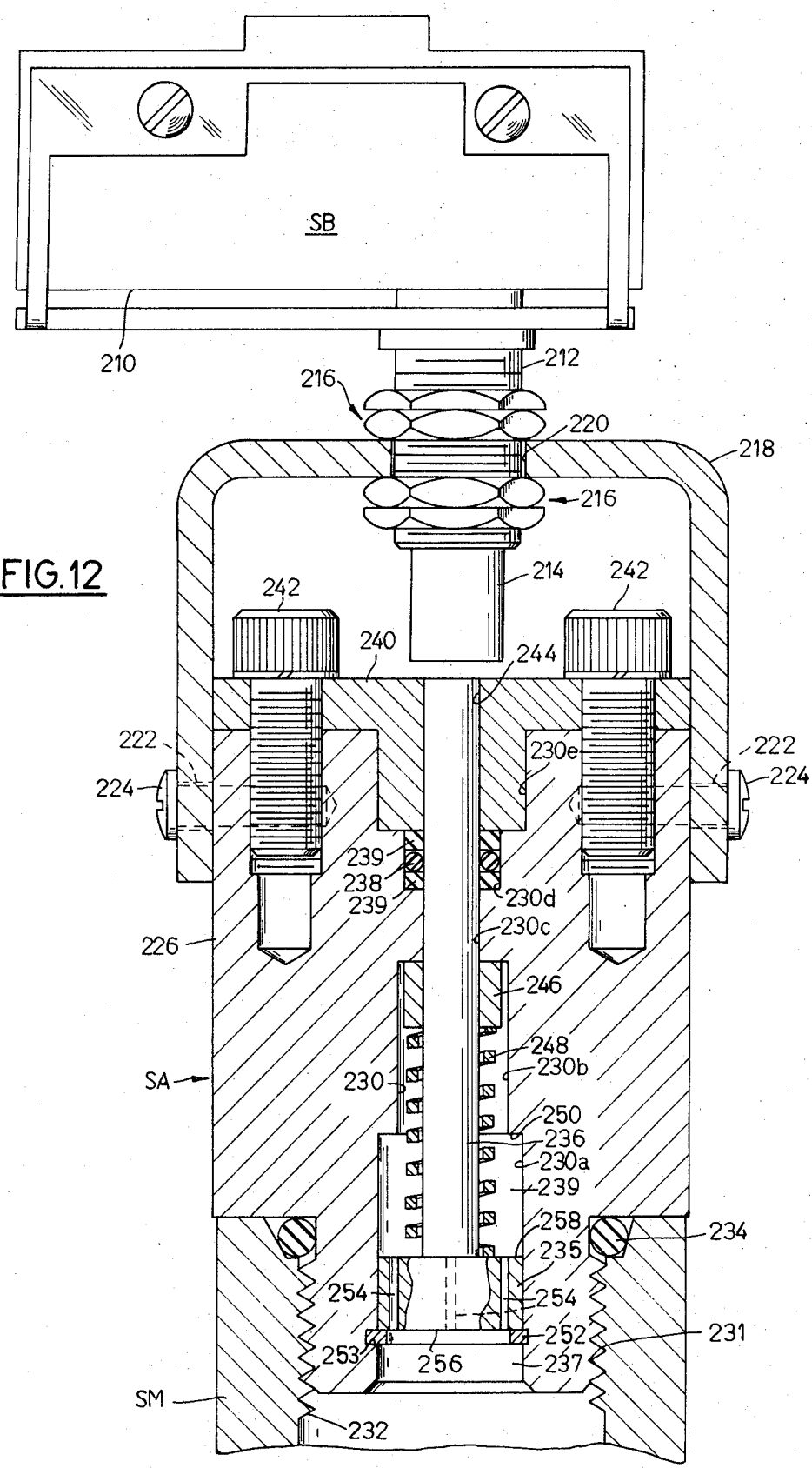

FLUID PRESSURE ACTUATED BRAKE LIGHT SWITCH

BACKGROUND OF THE INVENTION

1. Field of Use

This invention relates generally to motor vehicle warning light control systems and, particularly, to such control system having a fluid pressure responsive switch actuator for operating an electric switch to control warning brake lights on a hydraulically propelled and braked vehicle.

2. Description of the Prior Art

Some large self-propelled material handling vehicles, such as end loaders and lift trucks, operate over-the-road, as well as off-road, and therefore require rear-mounted brake lights. These brake lights illuminate to warn other drivers whenever the vehicle is being braked (decelerated) while traveling in the forward direction and also illuminate whenever the vehicle is operating at any speed in the reverse direction. Since the brake light illuminates whenever the vehicle is backed up, the light also meets the requirements for a back-up warning light, as well as brake light. Some such vehicles employ separate conventional accelerator pedals, brake pedals and shift lever mechanisms and, therefore, it is possible to use known conventional electromechanical control systems for operating the brake lights in the aforedescribed manner. However in vehicles of the aforedescribed character, wherein the vehicle ground wheels are propelled by hydraulic motors, and wherein conventional accelerator pedals, brake pedals and shift lever mechanisms are not employed, conventional brake light control systems are not readily adaptable thereto. For example, some hydraulically propelled vehicles employ an arrangement wherein a single multipurpose pedal control is used to effect forward or reverse vehicle travel at a desired speed and braking. Acceleration or deceleration of the vehicle is achieved by increasing or decreasing foot pressure on the pedal. Decreasing foot pressure results in a lesser or greater degree of hydrodynamic braking. Pending U.S. Pat. application Ser. No. 369,010, filed June 11, 1973 by Warren P. Geis for "Self-Propelled Vehicle Having Combined Directional and Acceleration Pedal Control" and assigned to the same assignee as the present application discloses a hydrodynamically propelled and braked vehicle of the latter type. It is difficult and costly to adapt and incorporate conventional brake light control systems in vehicles of this type. However, there are advantages both from the technical and economic standpoint to provide brake light control systems which are especially adapted to take advantage of components and inherent operational characteristics of hydrodynamically propelled and braked vehicles.

SUMMARY OF THE PRESENT INVENTION

In accordance with the present invention there is provided a hydrodynamically propelled and braked material handling vehicle, such as an end loader or lift truck, which is operable off-road and over-the-road and requires rear mounted brake lights for over-the-road operation. A control system in accordance with the invention is provided to cause the brake light to illuminate to warn other drivers whenever the vehicle is braked (decelerated) while traveling in the forward direction and which also illuminates substantially whenever the vehicle is traveling at any speed in the reverse direction.

The vehicle comprises front and rear ground wheels which are driven in forward or reverse directions by variable speed hydraulic motors which are supplied with fluid through a hydraulic circuit from engine-driven variable displacement reversible output hydraulic pumps. Each pump has an adjustably movable swash plate for controlling motor direction and speed. The engine has a throttle for regulating engine (and therefore pump) speed. The direction of movement and rate of speed of the vehicle is determined by a pivotably movable shuttle pedal control in the operator's car which is connected to the pump swash plates and to the engine throttle. The hydraulic circuit between the pump and the wheel motors for the front wheels of the vehicle comprises a relief valve manifold which has a passage or chamber therein wherein hydraulic fluid conditions vary, depending on vehicle direction and rate of acceleration and deceleration. More specifically, fluid pressure in the chamber increases beyond a predetermined level of about 300 psi, for example, whenever the vehicle is braked (decelerated) while moving forward and substantially always exceeds about 300 psi, for example, whenever the vehicle is moving at any speed in the reverse direction. In the event of emergency braking while operating in the forward direction, fluid pressure in the chamber can rapidly increase to about 7,000 psi.

The control system for the brake lights in accordance with the invention comprise an electric switch in circuit with the vehicle's electrical power supply and the brake lights and is operated by a fluid pressure responsive switch operator which, in turn, is connected to the aforesaid chamber in the relief valve manifold. Whenever fluid pressure in the chamber exceeds the predetermined level, the switch actuator operates the electric switch to turn on the brake lights. When fluid pressure falls below the predetermined level, the switch actuator operates the electric switch to turn off the brake lights. The electric switch preferably takes the form of a normally open single pole, single throw switch having a depressable plunger and secured in fixed position with respect to the switch actuator by means of a support bracket attached to the switch actuator. The actuator comprises a housing having a cylinder bore therein in which an axially slidable piston having an attached piston rod is mounted. The piston divides the cylinder bore into two (first and second) cylinder chambers, one (the first) of which is connected to the chamber in the relief valve manifold. The piston rod extends through the other cylinder chamber (and through a gland seal) to a location wherein it can engage and depress (close) the switch plunger whenever fluid pressure of the predetermined level exists in the first cylinder chamber and is applied to the piston. A return spring of predetermined resiliency is provided in the second cylinder chamber and acts on the piston to return it and the piston rod to switch open position when fluid pressure falls below the aforesaid predetermined level. The piston has a front face exposed to the first cylinder chamber against which the fluid pressure acts to cause extension of the piston rod and closure of the switch. The piston also has a rear face exposed to the second cylinder chamber from which the piston rod extends. Thus, a differential in piston areas exists between the two piston faces, with the front face having a larger area than the rear face. Fluid passages or cross holes extend through the piston between the front and rear faces. When, during emergency braking, extremely high fluid pressure is applied to the first cylinder chamber, force is also transmitted through the cross holes to the second cylinder chamber and the net force acting to move the piston to switch closed position is a function of the differential in area between the piston faces. In this manner, extremely high, possibly damaging forces are not applied to operate the actuator piston.

A vehicle brake light control system employing a switch actuator in accordance with the invention offers technical and economic advantages over prior art systems, especially when applied to hydrostatically propelled and braked vehicles. The system in accordance with the invention operates in direct response to actual system conditions thereby reducing the possibility of providing erroneous warning signals and reducing the risk of breakdown and failure of intermediate components. The switch actuator is responsive to but not adversely affected by extremely high hydraulic pressures and the electric switch operated by the actuator is not directly exposed to forces acting upon the actuator. Other objects and advantages of the invention will hereinafter appear.

DRAWINGS

FIG. 1 is a perspective view of the left side of a self-propelled vehicle, such as a forklift truck or end loader, having warning brake lights and a control system therefor in accordance with the invention;

FIG. 2 is a perspective view of a portion of the interior of the operator's cab of the vehicle of FIG. 1 showing a shuttle pedal control for effecting forward and reverse movement and acceleration and deceleration of the vehicle;

FIG. 12 is an enlarged cross section view of the brake light switch and switch actuator shown in FIG. 3;

DESCRIPTION OF A PREFERRED EMBODIMENT

General Arrangement

Figure 3:
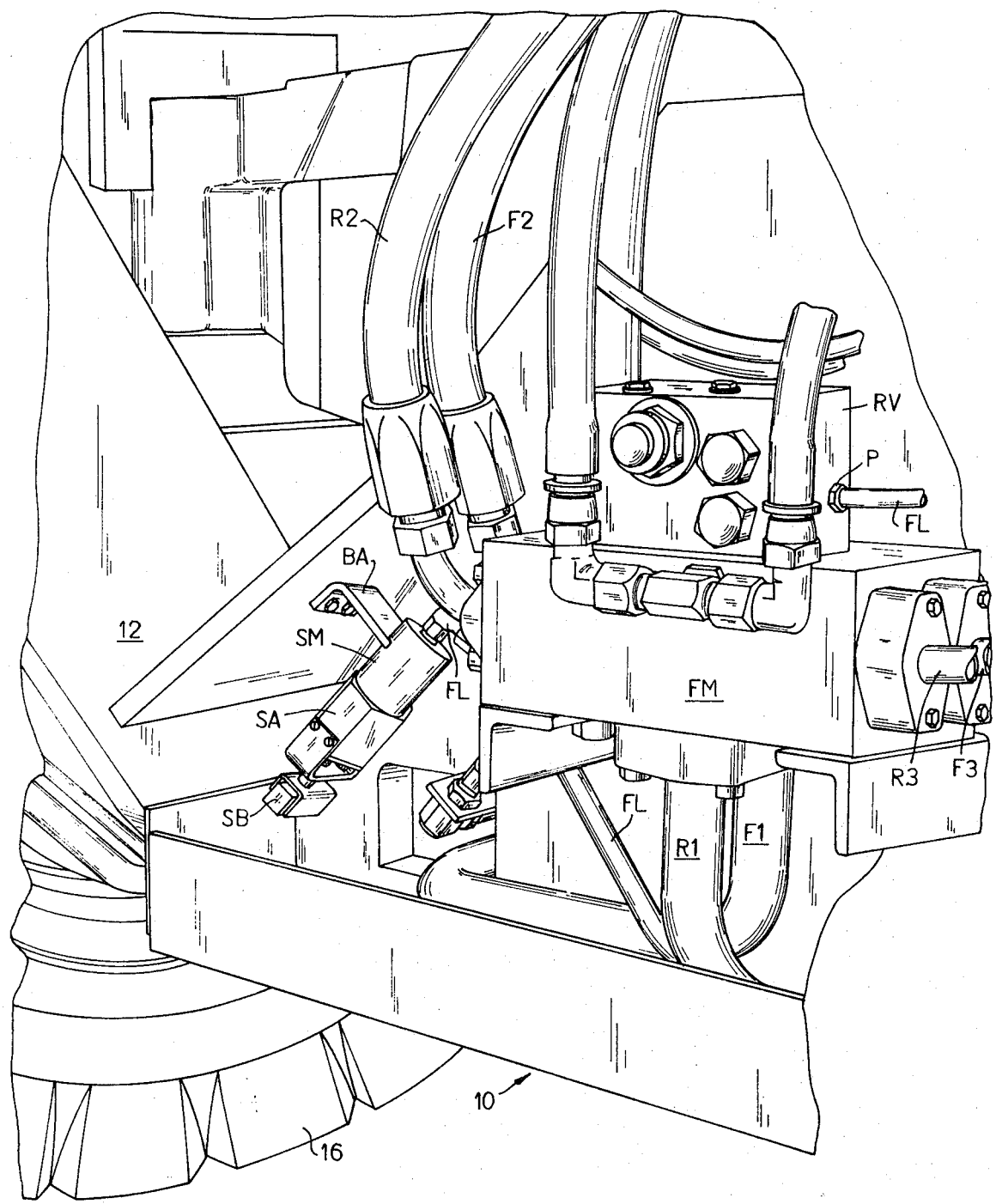
FIG. 3 is a perspective view of a portion of the front end of the vehicle shown in FIG. 1 showing a switch actuator and brake switch in accordance with the invention.

Referring to FIG. 1, the numeral 10 designates a self-propelled material handling vehicle, such as a heavy-duty hydraulically operated forklift truck, having warning brake lights and a control system therefor in accordance with the present invention. Vehicle 10 comprises a lower unit or chassis 12 on which an upper unit or body 14 is mounted. Body 14 is tiltable to a limited degree in opposite directions with respect to chassis 12 for leveling purposes, as when operating on rough terrain, as described in U.S. Pat. application Ser. No. 193,807, filed Oct. 29, 1971, and now abandoned, by Warren P. Geis et al. and entitled "Vehicle Having Transverse Leveling Means".

Chassis 12 is provided with a pair of hydraulically driven and hydraulically steerable rubber-tired front ground wheels 16 and a pair of hydraulically driven and hydraulically steerable rubber-tired rear ground wheels 18. An internal combustion engine 20, such as a gasoline or diesel engine, is mounted at the rear of chassis 12 and an operator's cab 22 is located near the forward end of the chassis.

Body 14 is provided with an upright frame 24 near the rear thereof on which a multisection telescopic boom 26 is mounted, as at 27, for pivotal and swingable movement in a vertical direction. Boom 26 is vertically swingable by means of a pair of large extendable and retractable hydraulic lift cylinders 29 connected between the boom and body 14. Boom 26 comprises a hollow base section 26A, a hollow intermediate section 26B telescopable within the base section, and an outermost end section 26C telescopable within the intermediate section. Sections 26B and 26C are telescopically movable by means of hydraulic cylinder 28, shown in FIG. 8, and understood to be located within boom 26. End section 26C has a generally downwardly extending frame 30 rigidly secured thereto. A load carrying L-shaped fork 31 is pivotally mounted, as at 32, to the free end of frame 30 and is angularly adjustable relative thereto by means of a pair of hydraulic tilt cylinders 34 connected between the fork and the frame. Fork 31 is automatically maintained level as boom 26 moves vertically due to the fact that the tilt cylinders 34 are actuated by a pair of slave cylinders 35 connected between the rear end of boom 26 and body 14 and responsive to boom movement.

Manually operable controls are located in cab 22 and comprise a steering wheel 37 for vehicle 10 and various control levers, such as 38, for controlling functions of boom 26. As FIG. 2 shows, a foot-operated throttle pedal 40 and a foot operated shuttle pedal 42 are mounted on the floorboard 44 in cab 22. Throttle pedal 40 is operated by the left foot of the vehicle operator and is used to regulate the speed of engine 20, when, for example, load lifting components, such as hydraulically operable boom 26 or hydraulically operable steering mechanism, are being utilized. Shuttle pedal 42 is selectively operated in opposite directions by the right foot of the vehicle operator and is depressed to control the forward and reverse direction of travel of vehicle 10, the ground speed in the selected direction, and is partially or fully released for hydrodynamic braking of the vehicle.

As FIG. 1 shows, vehicle 10 is provided at its rear end with a pair of spaced apart tail lights 46 located at the rear thereof and with one light near each side of the vehicle. Each light 46 is visible from the rear of the vehicle and comprises a conventional double filament bulb 46A which is a combined brake warning, turn and tail light. As FIG. 10 shows, each bulb 46A comprises a filament 46B which serves as the brake light for the vehicle and is adapted to illuminate or go on when vehicle 10 is braked (decelerated) while operating in the forward direction or when the vehicle is operated substantially at any speed in the reverse direction.

Figure 10:
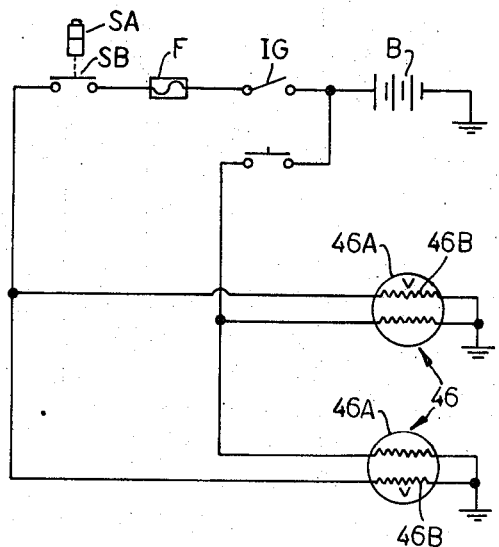
FIG. 10 is a schematic view of the electrical control circuit for the brake lights of the vehicle shown in FIG. 1.

Vehicle 10 is provided with an electrical system, part of which is shown in FIG. 10, which comprises a battery B having its negative side connected to the vehicle ground and having its positive side connected through a normally open master ignition switch IG, a fuse F, and a brake switch SB to one side of the filaments 46B of the bulbs 46A. The other sides of the filaments 46B are connected to the vehicle ground. When ignition switch IG is closed, the filaments 46B are energized or de-energized in response to the operation of brake switch SB.

As FIG. 3 shows, brake switch SB is physically located at the front end of the vehicle 10 and is associated with a switch actuator SA, hereinafter described in detail, which is responsive to hydraulic fluid pressure conditions within a chamber in relief valve RV mounted on a fluid distribution manifold FM also mounted at the front end of the vehicle. Actuator SA is rigidly secured to and supported by a hollow support member SM which supplies fluid from line FL to the actuator. Member SM is provided with a bracket BA by means of which it is bolted to chassis 12 of vehicle 10.

The Hydraulic System

Figure 4:
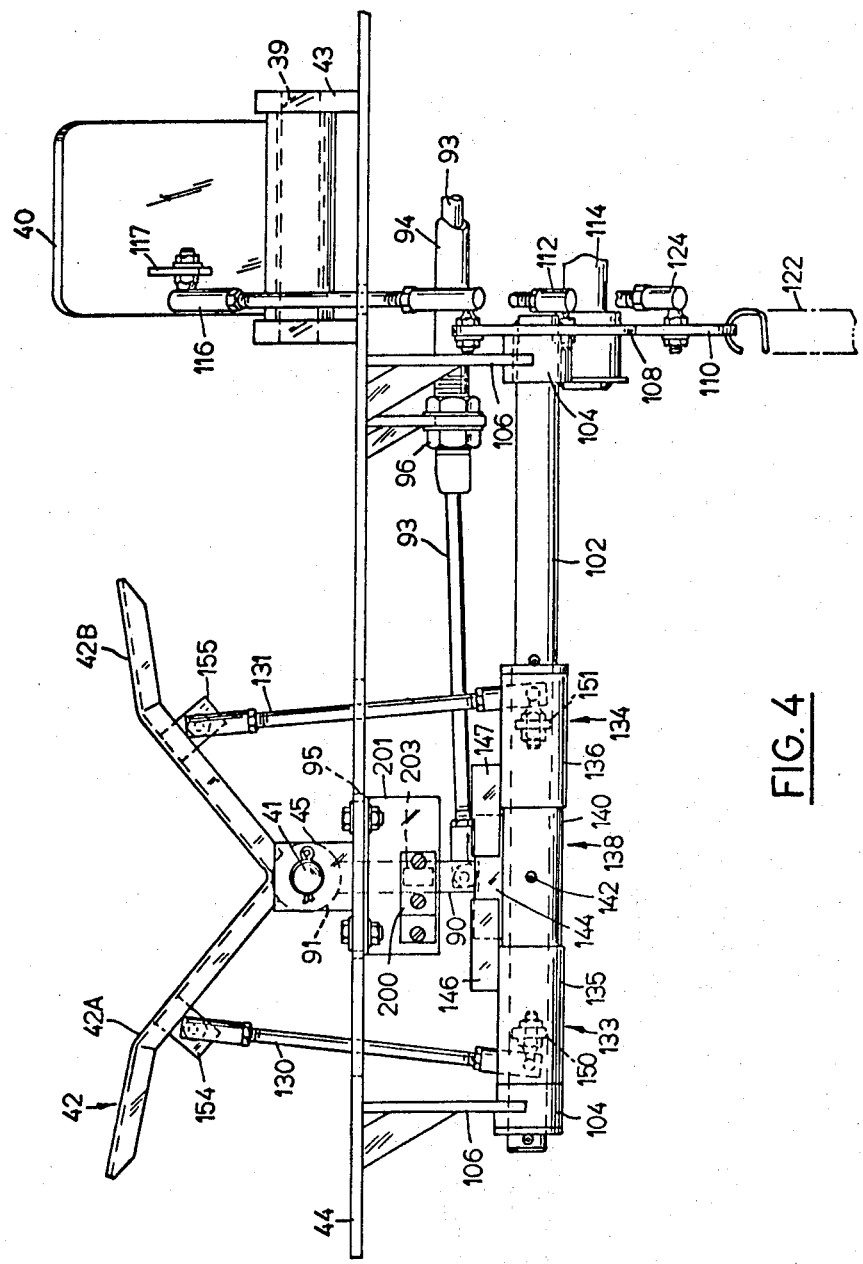
FIG. 4 is an enlarged front elevation view of the pedal controls shown generally in FIGS. 1 and 2.
Figure 5:
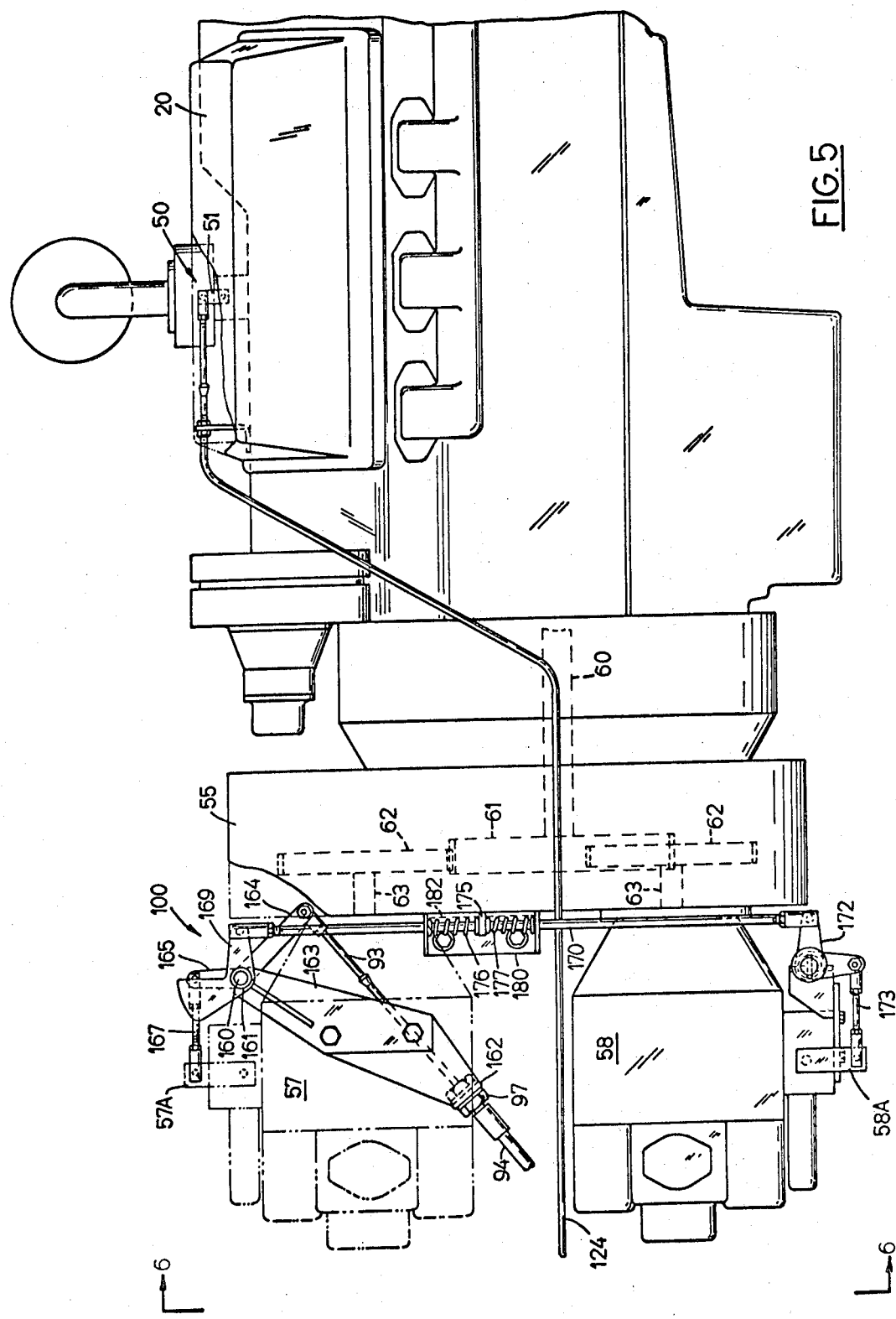
FIG. 5 is an enlarged elevation view, partly in phantom, of the left side of the engine, pumps and control linkage shown in FIG. 1.

Referring generally to FIGS. 1, 4, 5, 6 and 7, engine 20 is provided with a throttle 50 having a throttle control lever 51, shown in FIG. 5, which is pivotably movable between an engine idle position wherein it is shown, and a rearward position. It is to be understood that engine 20 is continuously in operation when vehicle 10 is in use and movement of lever 51 away from the idle position effects an increase in engine speed, whereas movement back toward idle position effects a decrease in engine speed.

Engine 20 is provided at its front end, as FIGS. 1, 4 and 5 show, with a pump drive housing 55 on which three hydraulic pumps 56, 57 and 58 are mounted. As FIG. 5 shows, engine 20 has an output shaft 60 with a drive gear 61 thereon which is in constant mesh with gears 62 which are provided on the shafts 63 of each of the three pumps. Thus, the three pumps are continuously driven by engine 20 and all pumps change speed in response to changes in engine speed.

Figure 8:
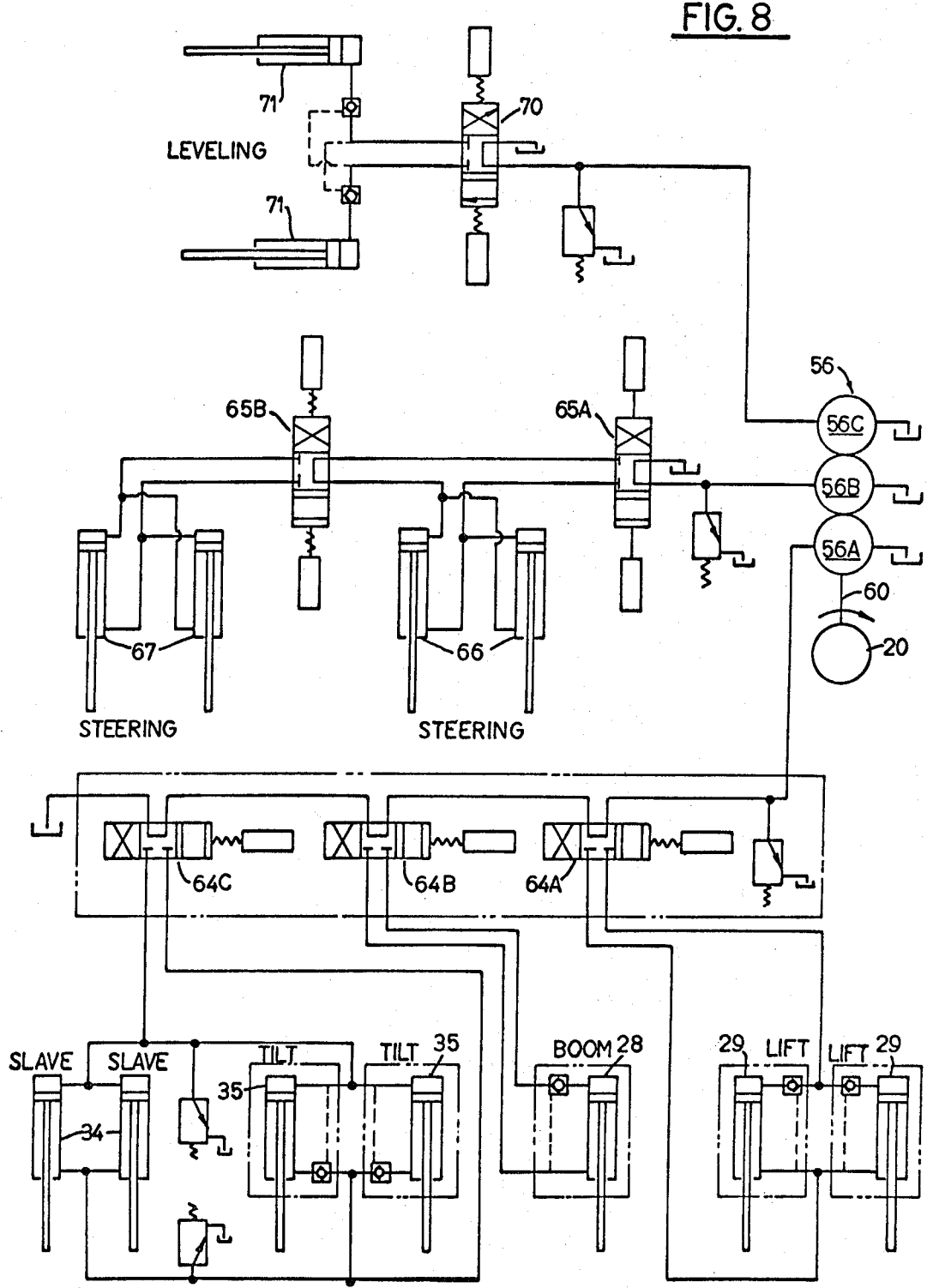
FIG. 8 is a schematic diagram of the hydraulic control circuit for other hydraulically powered components of the vehicle shown in FIG. 1.

Pump 56 is a conventional triple stage hydraulic pump of known type which, as FIG. 8 shows, supplies fluid from stage 56A through control valves 64A, 64B and 64C to operate the boom lift cylinders 29, the boom telescope cylinder 28, and the slave cylinder 35 and tilt cylinders 34 therefor. Stage 56B supplies fluid through control valves 65A and 65B to operate the front and rear steering cylinders 66 and 67, respectively. Stage 56C supplies fluid through a control valve 70 to operate the leveling cylinders 71.

Figure 6:
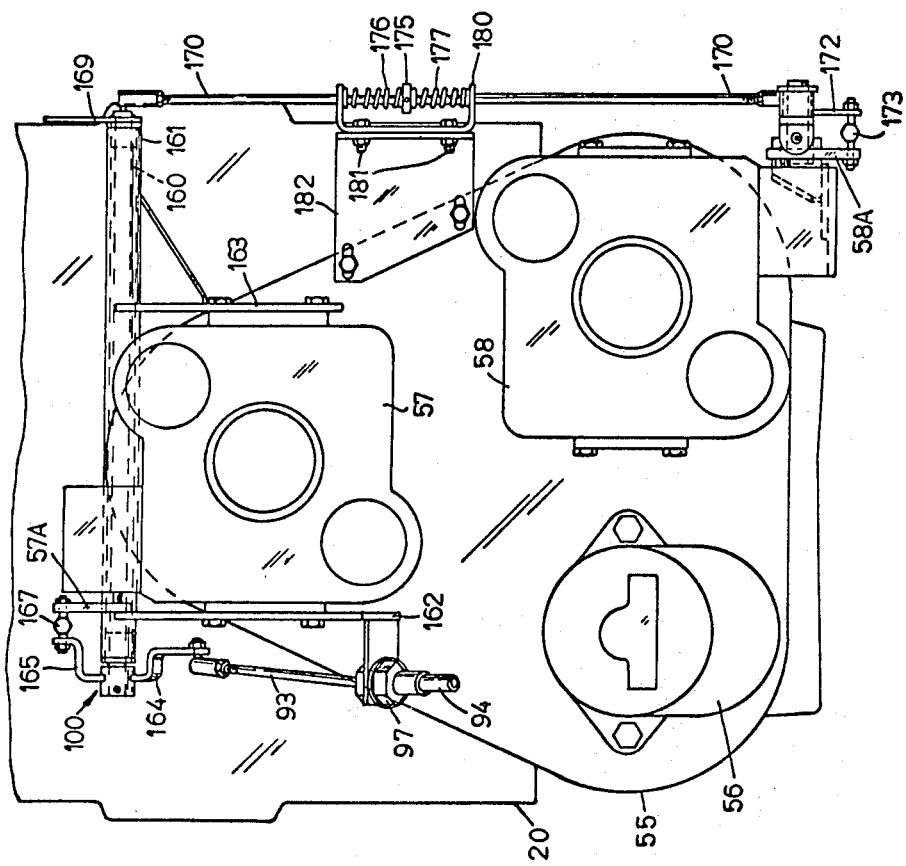
FIG. 6 is a view taken on line 6—6 of FIG. 5.
Figure 7:
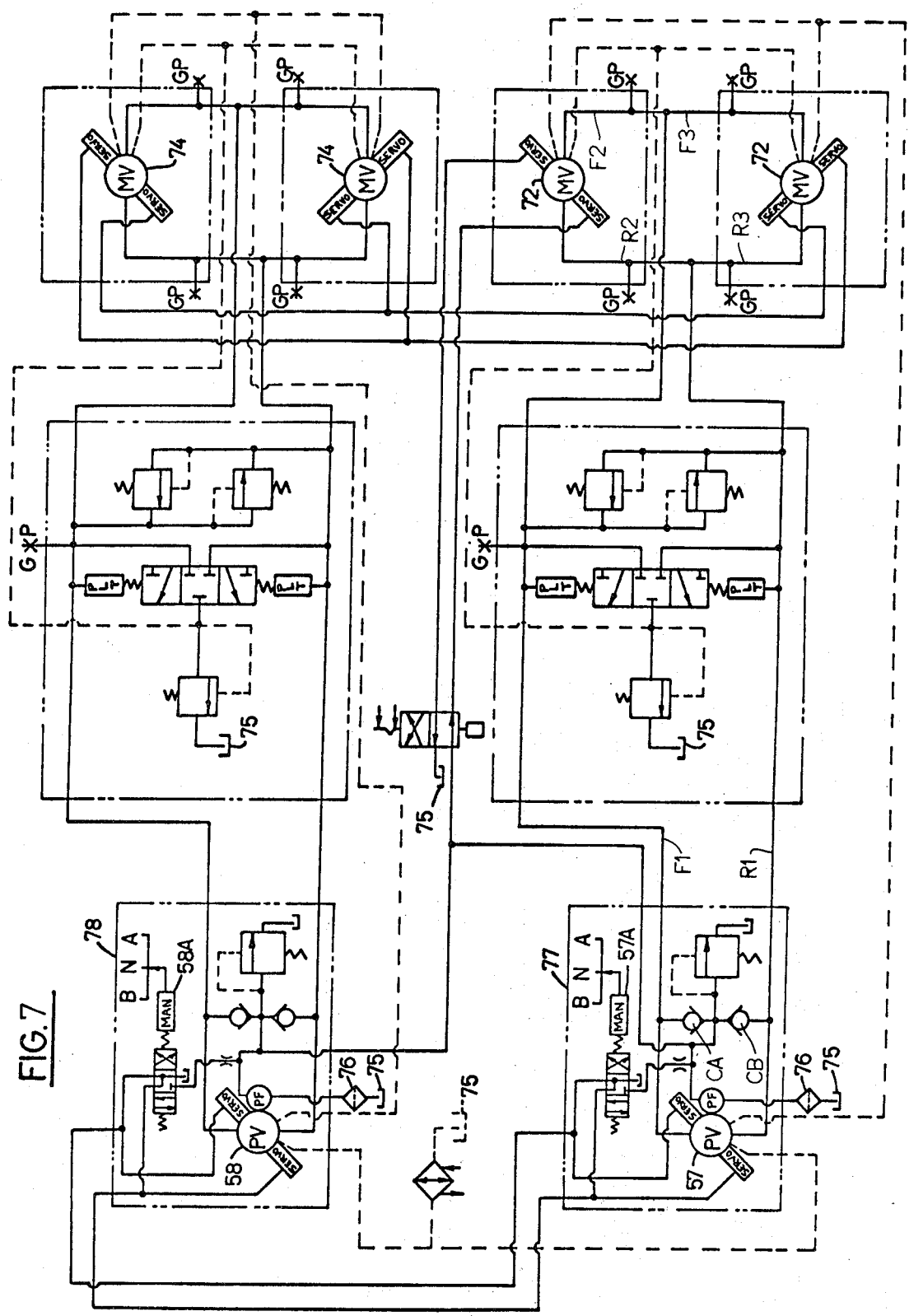
FIG. 7 is a schematic diagram of the hydraulic control circuit for the hydraulically driven ground wheels on the vehicle shown in FIG. 1.

The pumps 57 and 58, best seen in FIGS. 5 and 6, are each variable displacement reversible output hydraulic pumps of a conventional type, such as the Sundstrand Model No. 23 pump described in Bulletin 9630 of the Sundstrand Hydro-Transmission Division of Sundstrand Corporation, Ames, Iowa. The pumps 57 and 58 have pivotably movable swash plate control levers 57A and 58A, respectively, thereon. As FIG. 7 shows, pumps 57 and 58 are connected to supply operating fluid to the two front hydraulic motors 72 for the front wheels 16 and to the two rear hydraulic motors 74 for the rear wheels 18, respectively. Each motor 72 and 74 may be a variable motor, such as the Sundstrand Model No. 23 motor also disclosed in the aforesaid bulletin.

Figure 9:
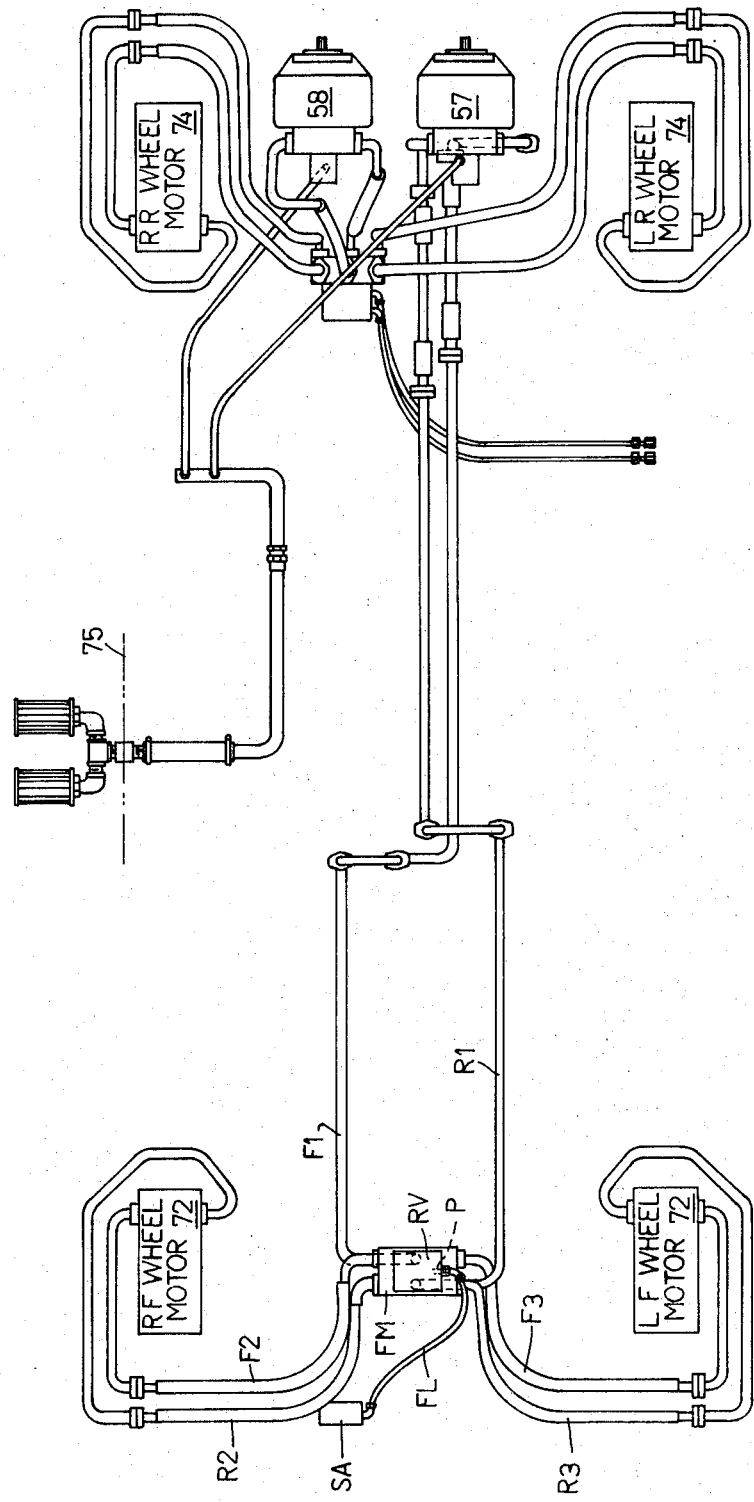
FIG. 9 is a diagrammatic view of a portion of the hydraulic circuit shown in FIG. 7.
Figure 14:
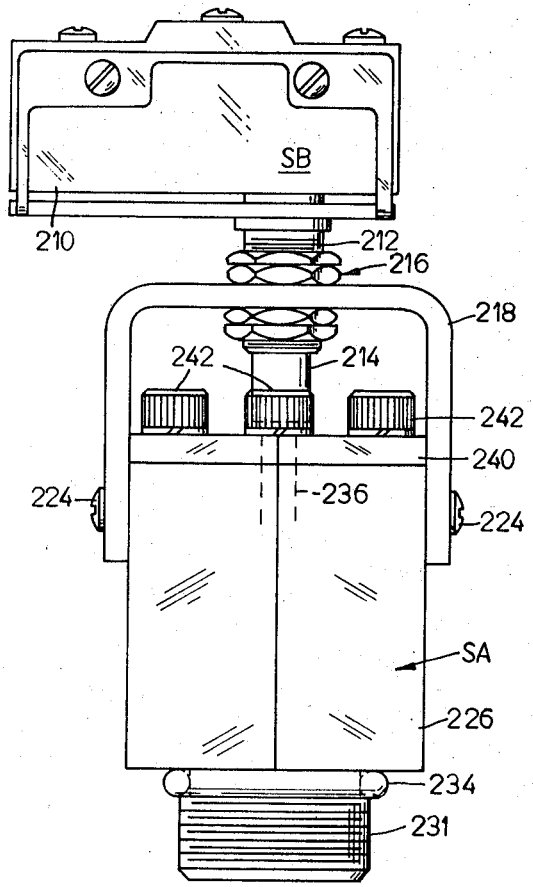
FIGS. 14 and 15 are elevation views of the switch and actuator shown in FIGS. 12 and 13.
Figure 15:
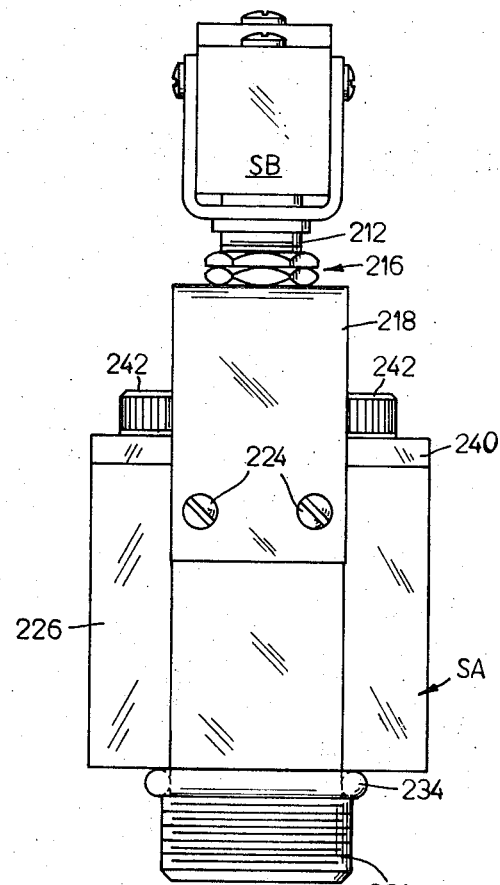
Figure 13:
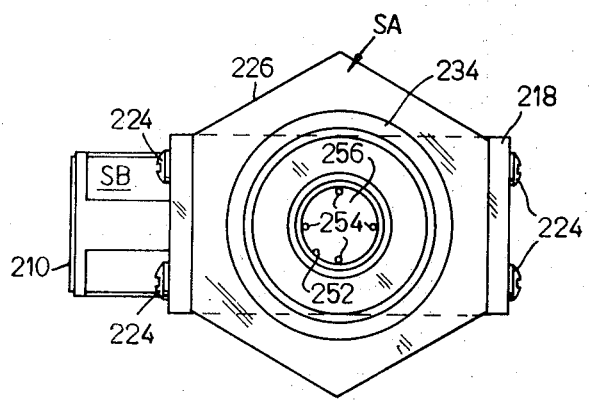
FIG. 13 is an end view of the switch actuator shown in FIG. 12.

As FIGS. 7 and 9 show, the two ports of pump 57 are connected by forward and reverse fluid lines F1 and R1 to the manifold FM located at the front end of vehicle 10. Manifold FM connects line F1 to the fluid lines F2 and F3 which supply the right front and left front wheel motors 72, respectively, with fluid for operation in the forward direction. Manifold FM also connects line R1 to the fluid lines R2 and R3 which supply the right front and left front wheel motors 72, respectively, for operation in the reverse direction. During operation of each motor 72, one of the fluid lines thereto serves as a fluid supply line and the other serves as a fluid return line, depending on the direction in which the motor is to be operated.

Figure 11:
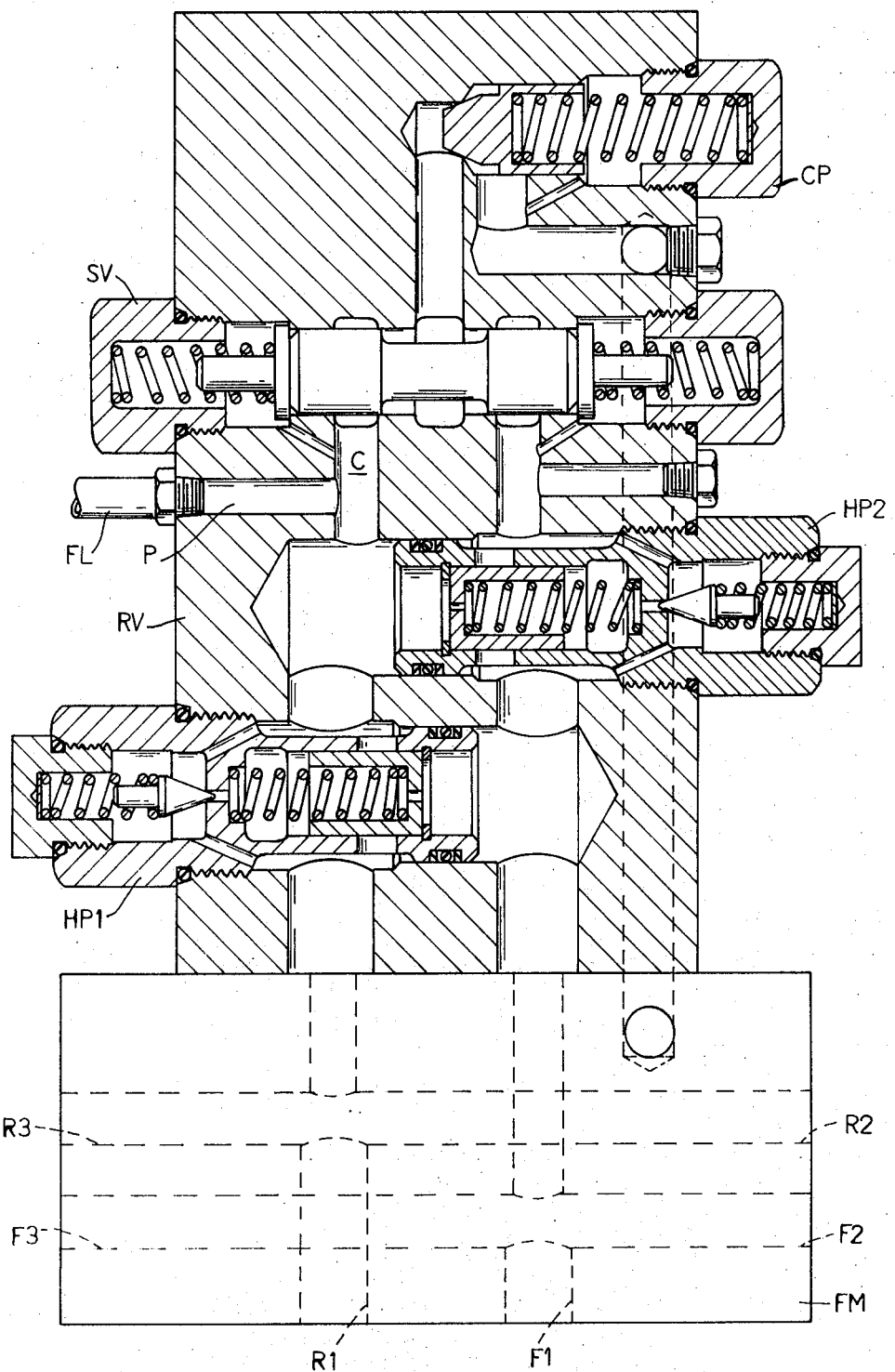
FIG. 11 is an enlarged cross section view of a relief valve shown in FIG. 9.

The relief valve RV which is associated with manifold FM comprises, as FIG. 11 shows, a chamber or passage C which is in communication with a port P which, in turn, is connected by means of a fluid line FL to the actuator SA for brake switch SB. The chamber or passage C in relief valve RV is connected to or in communication with the reverse line passage in manifold FM to which the reverse lines R1, R2 and R3 for the front wheel motors 72 are connected.

As FIG. 7 shows, oil flows from reservoir 75 through a filter 76 to the inlet of a charge pump PF mounted on the main pump 57 which is driven at pump shaft speed. The purpose of charge pump PF is to provide a flow of oil through the transmission for cooling purposes, to supply oil under pressure to maintain a positive pressure on the low pressure side of the main pump/motor circuit, to provide sufficient oil under pressure for control purposes, and for internal leakage makeup.

Oil from charge pump PF is directed to the low pressure side of the main circuit by means of one or two check valves CA or CB. The other check valve is held closed by the oil under high pressure on the other side of the main circuit. Oil flows in the main circuit comprising lines F1 and R1 in a continuous closed loop, as FIGS. 7 and 9 show. The quantity of oil flow is determined by the swashplate angle from neutral in pump 57.

The manifold FM and relief valve RV, connected across the main circuit, includes elements essential to provide for proper operation of the transmission. As FIG. 11 shows, the valve RV contains two pilot operated high pressure relief valves HP1 and HP2 which serve to prevent sustained abnormal pressure surges in either of the two main hydraulic lines F1 and R1 by dumping oil from the high pressure line to the low pressure line during rapid acceleration, abrupt braking, and sudden application of load.

Also provided in the valve RV is a shuttle valve SV and a charge pressure relief valve CP. The shuttle valve SV functions to establish a circuit between the main line that is at low pressure, and the charge pressure relief valve CP to provide a method of controlling the charge pressure level and also a means of removing the excess cooling oil added to the circuit by the charge pump PF. The shuttle valve SV is spring centered to a closed position so that during the transition of the reversing of pressures in the main lines, none of the high pressure oil is lost from the circuit.

Thus, fluid pressure at port P of relief valve RV exhibits or reads the same fluid pressure condition that exists in the reverse lines R1, R2, and R3 during operation of vehicle 10. It is to be understood that the operating characteristics of pump 5 and the motors 72 driven thereby are such that when the lines F1, F2 and F3 are pressurized and function as fluid supply lines to operate the front wheel motor 72 for forward operation at some constant speed, fluid pressure in the reverse lines R1, R2 and R3, which are then functioning as fluid return lines, is at some level, for example, below 300 psi. However, when the motors 72 are decelerated by operation of shuttle pedal 42 to control pump 57, pressure in the reverse lines R1, R2 and R3 increases to some value in excess of 300 psi, for example. The more rapid the rate of deceleration, the greater and more rapid is the increase of pressure in the reverse lines R1, R2 and R3 and, consequently, at port P of the relief valve RV. Conversely, when the reverse lines R1, R2 and R3 are functioning as fluid supply lines to operate the front wheel motors 72 for reverse operation, no matter at what speed, fluid pressure in the lines R1, R2 and R3 and at port P is substantially always at some value in excess of 300 psi, for example, although a momentary drop below this value conceivably may occur in some vehicles under some operation conditions.

Each pump 57 and 58 and its associated motors 72 and 74, respectively, provide a hydrodynamic transmission which offers infinite control of vehicle speed and direction. The operator has complete control of the system with one lever 57A and 58A effecting starting, stopping, forward motion or reverse motion of the wheels driven by that pump. Simultaneous control of the variable displacement, axial piston pumps 57 and 58 is the key to controlling vehicle 10. Prime mover horsepower from engine 20 is transmitted to the pump. When the operator moves the control levers 57A and 58A, the swash plate in the corresponding pump is tilted from neutral. When the variable pump swash plate (not shown) is tilted, a positive stroke to the pump pistons (not shown) is created. This, in turn, at any given input speed, produces a certain flow from the pump. This flow is transferred through high pressure lines to the motors. The ratio of the volume of flow from the pump to the displacement of the motors will determine the speed of the motor output shafts. Moving the control lever to the opposite side of neutral, the flow from the pump is reversed and the motor output shafts turn in the opposite direction. Speed of the motor output shafts is controlled by adjusting the displacement (flow) of the transmission. Load (working pressure) is determined by the external conditions, (grade, ground conditions, etc.) and this establishes the demand on the system.

As FIG. 7 shows, all valves required for a closed loop circuit are included in either the pump or motor assemblies. A reservoir 75, filter 76, control valves 77 and 78 and interconnecting fluid lines complete the circuit.

Pedal Controls

As FIG. 2 shows, the throttle pedal 40 and the V-shaped or butterfly-shaped shuttle pedal 42 are pivotably mounted on the floorboard 44 of cab 22 so as to be accessible, for example, to the operator's left and right foot, respectively. As FIG. 4 shows, the pedals 40 and 42 are supported for pivotal movement on transversely disposed pins 39 and 41, respectively, which are supported on brackets 43 and 45, respectively, which are welded to the floorboard 44. Throttle pedal 40 is depressible downwardly in one direction only about its pin 39, whereas shuttled pedal 42 is depressible or tiltable downwardly in seesaw fashion in two opposite directions about its pin 41, by applying pressure at the opposite right end 42A or left end 42B thereof. Shuttle pedal 42 has a central hub 91 from which a rigidly attached lever arm 90 downwardly depends through a hole 95 in floorboard 44. Lever arm 90 is connected to one end of an axially movable pump control cable 93. The other end of cable 93 is connected to a linkage 100 for operating the pump swash plate control levers 57A and 58A. Cable 93 is movable in a cable housing 94 which has each of its ends secured as at 96 and 97 to stationary brackets on vehicle 10. Movement of the shuttle pedal 42 in either direction effects corresponding movement of the pump swash plates to operate the pumps 57 and 58 simultaneously, as hereinbefore described.

A cylindrical pivot shaft 102 is rotatably mounted beneath the floorboard 44 on two spaced-apart bushings 104 which are supported on two brackets 106. Shaft 102 has a crank or plate 108 rigidly attached at one end thereof. A rod 116 is pivotally connected between a bracket 117 on the bottom of pedal 40 and plate 108. Movement of throttle pedal 40 effects rotary movement of plate 108 and shaft 102. Plate 108 is connected by a rod 112 to one end of an engine throttle crank 110. Crank 110 is pivotally mounted on a shaft 114 which is supported on a stationary portion of vehicle 10. A tension type biasing spring 122 is connected between the other end of lever 110 and a bracket 120 which is rigidly secured to a stationary portion of vehicle 10. Spring 122 acts to bias lever 110, plate 108, shaft 102 and throttle pedal 40 into their normal deactivated positions in readiness for depression of throttle pedal 40. Throttle crank 110 is connected by an axially movable control cable 124 to the throttle lever 51 on engine 20. Thus, depression of throttle pedal 40 effects operation of throttle lever 51 and causes an increase in engine speed. Conversely, release of pressure on throttle pedal 40 allows biasing spring 122 to return throttle lever 51 to idle position and to return the throttle pedal components to the deactuated position hereinbefore described.

The right and left sides of the shuttle pedal 42 are connected by rigid rods 130 and 131, respectively, to right and left pivot assemblies 133 and 134, respectively. The pivot assemblies 133 and 134 comprise hollow cylindrical members 135 and 136, respectively, which are rotatably mounted on shaft 102 in opposite sides of a stop member 138 which is disposed on shaft 102. Stop member 138 comprises a hollow cylindrical throttle control lever 51 to effect a change in engine speed and a corresponding change in the speed of the pumps driven by the engine. It is to be understood that an increase in engine speed is desired when any of the three engine driven pumps are being called upon to supply operating fluid to their associated hydraulic motors or actuators. This is necessary to provide increased power output from the pumps.

In the embodiment of the invention described herein, two variable displacement type pumps 57 and 58 are provided, one for supplying fluid to the rear wheel motors and the other for supplying fluid to the front wheel motors. As FIG. 5 shows, the pumps are mounted in inverted or upside-down relationship to one another and therefore the operating levers 57A and 58A must be connected by a suitable linkage 100 to effect simultaneous movement of the levers 57A and 58A. As FIGS. 5 and 6 show, the linkage 100 comprises a horizontally disposed rotatable shaft 160 which is mounted in a sleeve 161 which is supported on brackets 162 and 163 on a stationary portion of vehicle 10, such as gear housing. It is to be noted that cable 93 from shuttle pedal 42 is connected to a lever arm 164 which is rigidly attached to rod 160. Another lever arm 165 also rigidly attached to rod 160, is connected by a rod 167 to control member 57A of pump 57. A lever arm 169 is rigidly secured to the opposite end of shaft 160 and the lever 169 is connected by a downwardly extending elongated rod 170 to a bell crank assembly 172 which is connected by a rod 173 to control member 58A from pump 58. Rod 170 is provided with a stop member 175 thereon which is engaged between a pair of biasing springs 176 and 177. The springs 176 and 177 are trapped between the ends of a U-shaped bracket 180 which is rigidly secured as by bolts 181 to a support plate 182 on engine 20. When shaft 160 is rotated by cable 93 in response to operation of shuttle pedal 42, the axial movement of cable 93 is transmitted through linkage 100 to effect simultaneous movement of the pump control members 57A and 58A. When shuttle pedal 42 is returned to neutral, the springs 176 and 177 acting on rod 170 insure that the pump control member 57A and 58A both return to their neutral positions whereby the pumps 57 and 58 provide no fluid output.

An electric switch 200 is mounted on a bracket 201 and is actuated by a switch actuating member 203 rigidly secured to shuttle pedal 42. The purpose of the switch is to prevent engine 20 of vehicle 10 from being started unless shuttle pedal 42 is in neutral position.

Switch Actuator and Switch

Referring to FIGS. 12, 13, 14 and 15, switch SB takes the form of a normally open single pole double throw switch, such as a model number BZ-2R-551-A2 Micro Switch, for example. Switch SB comprises a housing 210 having a generally cylindrical threaded sleeve 212 on one side which adapts it for mounting and from which a straight depressible plunger 214 extends. Depression plunger 214 causes closure of the switch contacts and illumination of tail lights 46 and release of the plunger causes opening of the switch contacts and turns off the tail lights. Sleeve 212 is provided with a pair of lock nuts 216 by means of which it is secured to the central portion of a U-shaped bracket 218 which has a switch mounting hole 220 therein. Bracket 218 has a plurality of mounting holes 222 in its leg portions which adapt it for connection, as by means of bolts or screws 224, to the housing 226 of actuator SA.

The actuator housing 226 is hexagonal in form and is provided with a cylinder bore 230 which extends axially therethrough between opposite ends of the housing. Housing 226 is machined at one end to provide an externally threaded section 231 which adapts the housing for connection to an internally threaded passage 232 in member SM. The other end of passage 232 is connected to fluid line FL. An O ring 234 is disposed around section 231 and between housing 226 and member SM.

The cylinder bore 230 is machined so as to provide regions or sections of different diameters (designated as sections 230a, 230b, 230c, 239d and 230e) and also to provide shoulders which serve various functions, as hereinafter explained. A piston 235 having a piston rod 236 attached thereto is mounted for axial movement in bore section 230a. The piston 235 and piston rod 236 are shown in the depressurized (switch open) position and are understood to be axially movable upward (with respect to FIG. 12) in bore 230 to depress switch plunger 214 and thereby actuate switch SB to closed position. An O ring 238 sandwiched between backup rings 239 is mounted on piston rod 236 in bore section 230d and serves as a gland seal for bore 230. The O ring 238 and backup rings 239 are held in place by a retainer 240 which has a portion which extends into bore section 230e. Retainer 240 is held in place on housing 226 by means of four machine screws 242. Retainer 240 has a centrally located hole 244 for accommodating piston rod 236. A bushing 246 is disposed on piston rod 236 in bore section 230b and also assists in sealing the bore. A coil type return spring 248 is mounted on piston rod 236 between bushing 246 and piston 235 and acts to return the piston and piston rod to switch open position when fluid pressure in bore 230 permits. Spring 248 is designed to compress when fluid pressure acting on piston 235 reaches or exceeds 300 psi, for example. Inward travel (upward with respect to FIG. 12) of piston 235 is limited by a shoulder 250 formed at the junction between bore sections 230a and 230b. Outward travel (downward with respect to FIG. 12) of piston 235 is limited by a snap ring 252 which fits in an annular groove 253 formed in bore section 230a. Piston 235 divides bore section 230a into two chambers 237 and 239 and the first chamber 237 is connected to receive fluid from port P of relief valve RV. Piston 235 is provided with four passages or cross holes 254 which extend between the outer face 256 and inner face 258 of the piston to provide communication between first chamber 237 and second chamber 239. The cross holes 254 enable extremely high pressure fluid supplied to bore section 230a to act on both outer face 256 and inner surface 258 of piston 235. The area of the inner piston surface 258 is smaller than the area of the outer piston surface 256 by an amount equal to the cross section area of piston rod 236 connected thereto. The difference in area between the opposite sides of piston 235 effects upward movement of the piston under extremely high pressure conditions in bore section 230a and prevents damage to the actuator components when forces go as high as 7,000 psi.

Operation

Assume that ignition switch IG is closed, that engine 20 is running and pumps 57 and 58 are running and that shuttle pedal 42 is in neutral. Vehicle 10 is now ready to be moved in forward or reverse direction at a desired rate of speed by proper application of shuttle pedal 42. In neutral, vehicle 10 is hydrodynamically braked.

Now assume that shuttle pedal 42 is depressed to cause vehicle 10 to move forward. As long as vehicle 10 is accelerating or running at constant speed, fluid pressure in first chamber 237 of switch actuator SA (which is connected to port P of relief valve RV) remains below 300 psi. However, if shuttle pedal 42 is operated to decelerate or brake vehicle movement in the forward direction, fluid pressure in reverse lines R1, R2 and R3 and in chamber 237 increases to or beyond 300 psi, depending on the rate of deceleration, the force of spring 248 is overcome and piston 235 moves upward to cause piston rod 236 to depress switch plunger 214 thereby causing closure of switch SB and illumination of the brake light filaments 46B in bulbs 46A of the tail lights 46.

In the event of emergency braking operation of foot pedal 42, high pressure fluid forces are applied to opposite faces of piston 235 and the piston responds to the force differential on its opposite faces to actuate the tail lights in the manner described.

If shuttle pedal 42 is depressed to cause vehicle 10 to move in reverse, pressure in reverse lines R1, R2 and R3 and in chamber 237 of switch actuator SA substantially always exceeds 300 psi and the filaments 46B remain energized as long as vehicle 10 is operated in reverse.

I claim:

1. In a self-propelled vehicle having a brake light operable to illuminate when the vehicle is braked while moving in the forward direction and substantially whenever the vehicle is moving at any speed in the reverse direction: hydraulic control means to selectively operate said vehicle in forward or reverse directions, said hydraulic control means comprising a fluid passage wherein fluid reaches a predetermined pressure condition when said vehicle is braked while operating in the forward direction and substantially whenever said vehicle is operating at any speed in the reverse direction; a pressure responsive switch actuator operably connected to said passage and responsive to pressure conditions therein; a source of electric power; and a switch operated by said actuator for controlling energization of said brake light from said source of power; said actuator effecting operation of said switch to cause said brake light to illuminate whenever fluid in said passage reaches said predetermined pressure condition.

2. In a self-propelled vehicle having driven ground wheels operable in forward and reverse direction and having a brake light: hydraulic motor means for driving said ground wheels; hydraulic pump means for supplying fluid to said motor means; a hydraulic circuit between said pump and motor means; selectively operable control means for directing fluid between said pump and motor means through said hydraulic circuit for driving said wheels at variable speeds in forward or reverse directions and for effecting hydrodynamic braking of the vehicle, said hydraulic circuit comprising a fluid passage wherein fluid reaches a predetermined pressure condition upon hydrodynamic braking of the vehicle, a pressure responsive switch actuator operably connected to said passage and responsive to pressure conditions therein; a source of electric power for said brake light; and a switch operably connected to said actuator for controlling energizaton of said brake light from said source of power; said actuator effecting operation of said switch to cause said brake light to illuminate whenever fluid in said passage reaches said predetermined pressure condition.

3. A vehicle according to claim 2 wherein said hydraulic circuit comprises a pair of fluid lines between said pump and motor means through which fluid flow is in opposite directions, said passage communicating with at least one of said fluid lines and the fluid therein reaching said pressure condition whenever fluid pressure in said one fluid line exceeds a predetermined level.

4. A vehicle according to claim 3 wherein said one fluid line conducts fluid flow from said pump means to said motor means when said control means effects vehicle operation in the reverse direction.

5. In a self-propelled vehicle having a brake light operable to illuminate when the vehicle is braked while moving in the forward direction and substantially whenever the vehicle is moving at any speed in the reverse direction: hydraulic control means to selectively operate said vehicle in forward or reverse directions at variable rates of speed and to brake said vehicle, said hydraulic control means comprising a fluid passage wherein fluid reaches a predetermined pressure when said vehicle is braked while operating in the forward direction and whenever said vehicle is operating at any speed in the reverse direction; a pressure responsive switch actuator mounted on said vehicle and connected to said passage and responsive to pressure conditions therein; a source of electric power; and a switch mounted in a fixed position with respect to said actuator and including a movable operating member operated by said actuator for controlling energization of said brake light from said source of power; said actuator effecting operation of said switch to cause said brake light to illuminate whenever fluid in said passage reaches said predetermined pressure, said actuator comprising: a housing having a cylinder therein, a piston in said cylinder dividing said cylinder into first and second chambers and movable between a non-actuating and actuating position, a piston rod connected to and movable with said piston and extending through said second chamber into operative relationship with said movable operating member of said switch, and biasing means for maintaining said piston and piston rod in non-actuating position when fluid in said passage and in said first chamber is below said predetermined pressure.

6. A vehicle according to claim 5 wherein said piston has a passage therethrough communicating between said first and second chambers, a fluid input in said first chamber connected to said fluid passage in said hydraulic control means; said piston rod being connected to the side of said piston confronting said second chamber and diminishing the effective area of said side of said piston so that a differential in effective area exists between opposite sides of said piston; said biasing means being disposed between said housing and said piston for maintaining said piston and piston rod in non-actuated position when fluid pressure in said first chamber is below said predetermined pressure; and sealing means between said housing and said piston rod for sealing said second chamber.

7. A vehicle according to claim 6 wherein said biasing means comprises a cylindrical compression spring disposed around said piston rod between said piston and a portion of said housing.

8. A vehicle according to claim 6 including means for limiting piston travel and defining said actuated and non-actuated position, said means comprising projections on said housing in said first chamber.

* * * * *